July 7, 1970   C. D. ERICKSON   3,518,881
ROTOR BALANCE SYSTEM FOR TURBINE FLOWMETER
Filed April 4, 1968
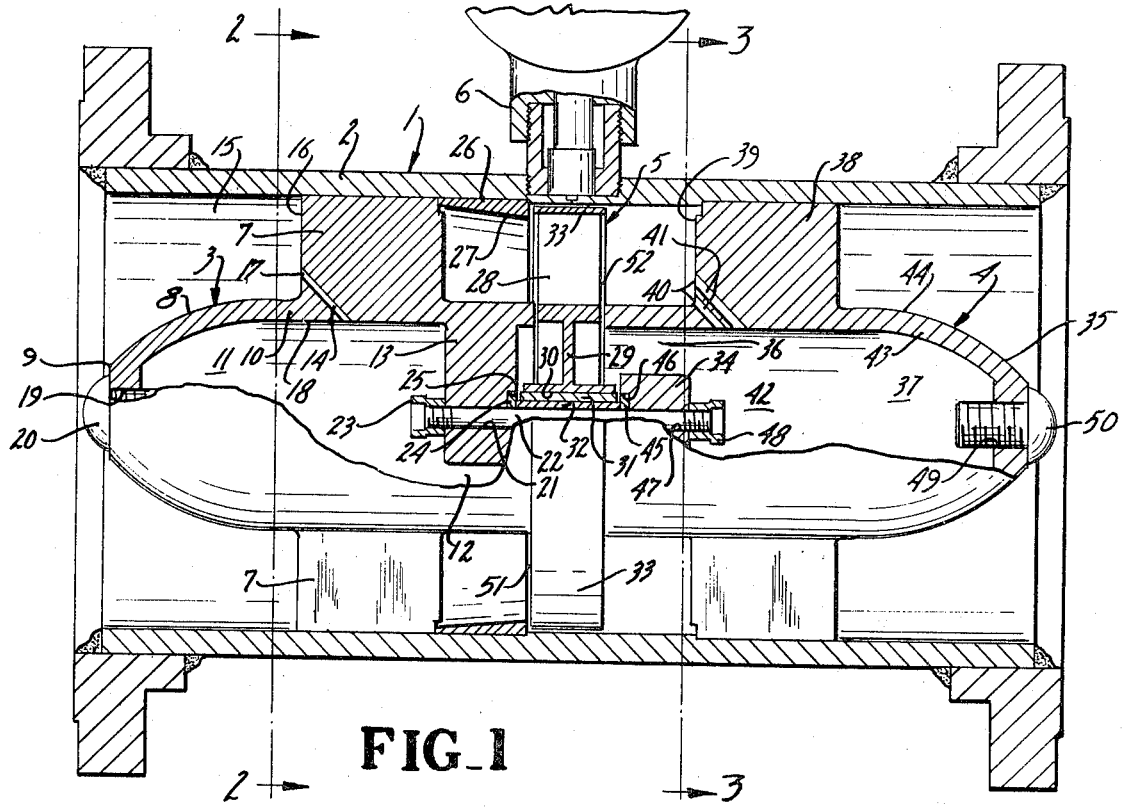
FIG_1
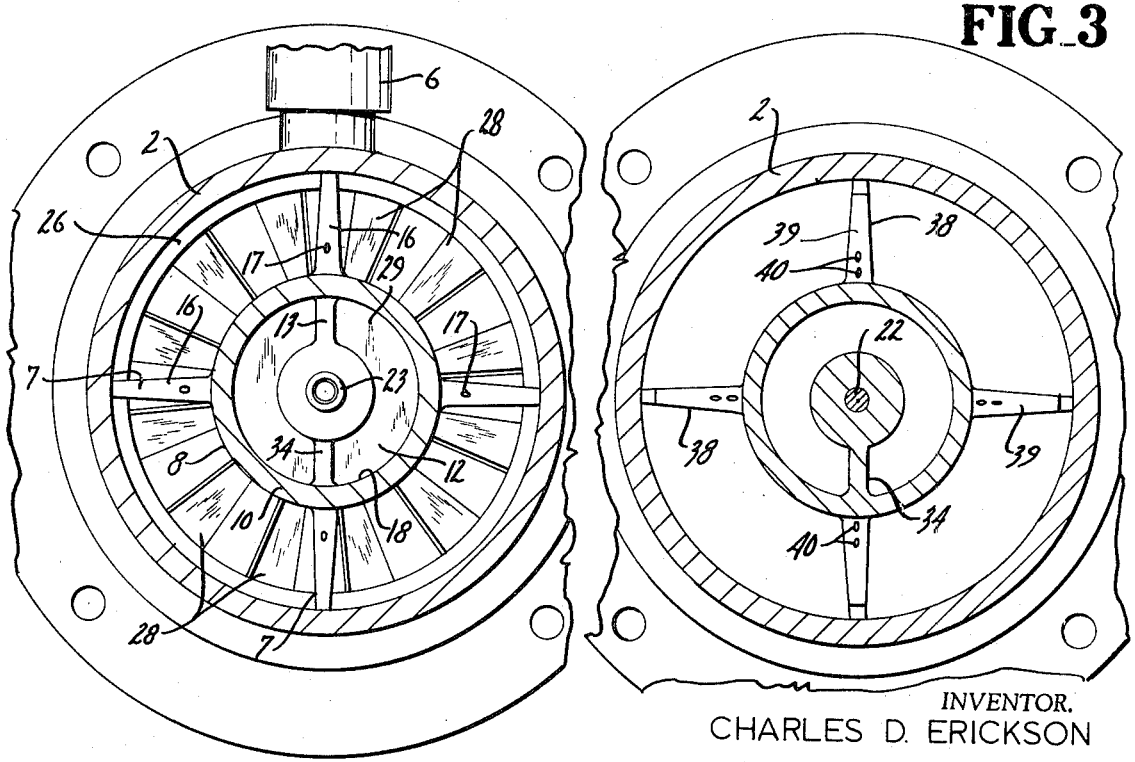
FIG_2
FIG_3
INVENTOR.
CHARLES D. ERICKSON
BY Howard J. Barnett
Attorney

United States Patent Office 3,518,881
Patented July 7, 1970

3,518,881
ROTOR BALANCE SYSTEM FOR TURBINE FLOWMETER
Charles D. Erickson, Erie, Pa., assignor to A. O. Smith Corporation, Milwaukee, Wis., a corporation of New York
Filed Apr. 4, 1968, Ser. No. 718,836
Int. Cl. G01f 1/10; G01d 3/02
U.S. Cl. 73—231                                   7 Claims

ABSTRACT OF THE DISCLOSURE

An improved turbine flowmeter having a highly sensitive rotor balance system particularly well adapted to accurately meter low viscosity fluids such as gasoline. The rotor balancing intakes in both the upstream and downstream side of the rotor are disposed out in the rotor mounting shield support vanes in the areas of greatest velocity in the flowing stream. In this way, the maximum available pressure resulting from velocity head effect positions the rotor between the rotor mounting shields with highly sensitive fluid balance, thereby assuring maximum fluid metering accuracy over a wide range of fluid flow rates, and with low viscosity fluids.

BACKGROUND OF THE INVENTION

Turbine flowmeters are described in U.S. Pats. 2,709,755, 3,238,776, 3,248,943 and others. The basic concept common to all meters of this type is to dispose an annular vane-type rotor in a flowing fluid stream, and externally sense its rate of rotation by electromagnetic means, radiant ray interruption and detection (U.S. Pat. 3,306,105) or some other detecting means for sensing the rotational speed of the rotor.

The main challenges in the creation of an effective and accurate turbine flowmeter for measuring non-steady flows is to overcome the inherent inertia of the rotor, and to eliminate viscous damping provided by the blades. Particularly in applications where rapidly changing flow rates are encountered, it is most important that a maximum sensitivity to flow rate changes be provided in the metering device. By meeting the above challenges, it is possible to take advantage of the attractive manufacturing economies available due to the simple design of a turbine flowmeter as compared to positive displacement type meters.

This invention is directed to a rotor balancing system which utilizes the maximum available fluid pressure to obtain more accurate metering in low viscosity fluids over a wide range of flow rates, because the rotor positioning system responds rapidly to any changes to re-establish rotor equilibrium conditions. The rotor balancing intakes are disposed in the highest stream velocity areas on both the upstream and downstream sides of the meter. By utilizing the highest available fluid pressure, the balancing system responds rapidly to slight fluctuations in flow conditions and returns to a balanced metering operation substantially immediately.

SUMMARY OF THE INVENTION

The turbine flowmeter of this invention comprises a pair of identically cast, bullet-shaped rotor mounting shields disposed concentrically in a tubular housing adapted to be connected in a fluid flow system. The mounting shields are supported by a plurality of integral stationary fin-like vanes which radiate outwardly from the shields and which are supported by the inner surface of the tubular member. Each bullet-shaped mounting shield has a central fluid chamber, and each has an integral rotor shaft support hub near its inner end adjacent the opposing mounting shield. A fixed rotor shaft is suspended between the adjacent rotor shaft supports. Spacing of the opposed rotor mounting shields is accomplished by means of annular stepped shoulders formed in the inside surface of the tubular housing, against which the outermost edges of the opposing mounting shield vanes are held by the rotor shaft. A vaned rotor having a central hub and a plurality of peripherally disposed, helicoid vane members is rotatably disposed on the fixed rotor shaft between the opposed upstream and downstream rotor mounting shields.

Each support vane of the upstream rotor mounting shield is provided with a fluid passage between the highest upstream velocity area of the flowing stream and the upstream pressure chamber in the mounting shield. Each passage has an inlet end disposed out in the middle of the upstream edge of the web of the vane and extends diagonally to the pressure chamber inside the shield.

The support vanes of the downstream rotor mounting shield are also provided with diagonal passages which also have inlets disposed out in the middle of the upstream edge of the web of the respective vanes, and extend diagonally inwardly into the pressure chamber of the downstream rotor mounting shield. If desired, a plurality of parallel, diagonally oriented passages may be included in each downstream support vane to provide sufficient upstream counterthrust to the rotor hub to counterbalance the additional downstream force on the hub created by fluid drag against the rotor vanes as it is flowing through the meter.

BRIEF DESCRIPTION OF THE DRAWING

FIG. 1 of the drawing is a side plan view of the turbine flowmeter of the invention with parts broken away and partly in section;

FIG. 2 is a transverse sectional view taken on line 2—2 of FIG. 1 looking toward the vane supports for the upstream rotor mounting shield and the rotor vanes; and FIG. 3 is a transverse sectional view taken on line 3—3 of FIG. 1 showing the downstream rotor mounting shield vane supports.

DESCRIPTION OF THE PREFERRED EMBODIMENT

The drawings show a turbine flowmeter assembly 1, which comprises a tubular housing 2, which surrounds and supports an upstream rotor mounting-shield assembly 3 and a downstream rotor mounting-shield assembly 4. Together, the mounting-shield assemblies 3 and 4 support a rotor assembly 5. A detector unit 6, of any well-known type, is mounted in the plane of the rotor assembly 5 on the outside of the tubular housing 2 to detect and register flow through the rotor assembly 5.

The upstream rotor mounting-shield assembly 3 includes a plurality of integral, radial vanes 7, which support a bullet-shaped shield member 8 axially in the tubular housing 2. The shield member 8 includes a nose 9, a chamber wall 10 having a central pressure chamber 11 contained therein, a downstream orifice 12, and an integral rotor shaft support 13 which extends from the downstream end of the chamber wall 10 into the center of the downstream orifice 12 of the chamber 11.

A plurality of fluid passages 14 extend diagonally inwardly through the respective radial vanes 7 to connect annular flow passage 15 defined between the tubular housing 2 and the shield member 8 with the central pressure chamber 11 in the shield member 8. Each radial vane 7 has an upstream edge 16 which has at least one intake 17 for one of the fluid passages 14 disposed approximately halfway between the shield member 8 and inner wall 18 of the tubular housing 2. The respective intakes 17 are therefore located at the area of maximum available fluid pressure resulting from velocity head effect, and the passages 14 directly transmit this pressure into the chamber 11 and, therefore, to the downstream orifice 12.

The nose 9 of the shield member 8 also includes an axial, threaded access opening 19, which is normally closed by a threaded closure bolt 20. The opening 19 provides access for assembly and disassembly of the rotor assembly 5. The rotor shaft support 13 includes an axial opening 21, through which one end of rotor shaft 22 extends. A rotor shaft nut 23 is threadably received on the end of the rotor shaft 22 to secure it to the rotor shaft support 13. A thrust bearing 24 is disposed in a recess 25 in the downstream end of the axial opening 21, around the rotor shaft 22. A flow deflector ring 26 is disposed just downstream of the radial vanes 7, and includes an inner tapered surface 27 for deflecting fluid into rotor vanes 28 of the rotor assembly 5.

The rotor vanes 28 are helical, blade-like members as best seen in FIG. 2, and extend radially outwardly from a central hub 29 which has a centrally disposed, axial rotor shaft opening 30, through which the rotor shaft 22 extends to rotatably support the rotor assembly 5. A pair of sleeve bearings 31 and 32 are provided coaxially around the shaft 22 to provide substantially friction-free rotation of the rotor assembly 5. An outer, cylindrical ring 33 surrounds the rotor vanes 28 and is connected to their respective outer edges to provide additional structural strength to the rotor assembly 5.

The downstream end of the rotor shaft is supported in a rotor shaft support 34, similar to the upstream rotor shaft support 13. The remaining parts of the downstream rotor mounting-shield assembly 4 are similar to those of the upstream rotor mounting-shield assembly 3. The downstream mounting-shield assembly is disposed having its nose 35 facing downstream and orifice 36 of pressure chamber 37 facing upstream, opposite the downstream orifice 12, so that the central hub 29 of the rotor assembly 5 is disposed therebetween on the rotor shaft 22.

Each radial support vane 38 of the downstream rotor mounting-shield assembly 4 has an upstream edge 39 which includes one or more fluid intakes 40, which transmit fluid from the annular flow passage 15, through diagonal passages 41 into pressure chamber 42, inside chamber wall 43 of shield member 44. It is desirable to provide several fluid intakes 40 in each support vane 38 or at least larger fluid passages than the passages 14 of the upstream vanes 7 to compensate for rotor drag caused by fluid impinging on the rotor vanes 28. The fluid enters the pressure chamber 42 through the passages 41 and provides a counterbalancing fluid pressure against the downstream side of the rotor central hub 29. A thrust bearing 45, similar to the thrust bearing 24 is disposed in a recess 46 in axial shaft opening 47 in rotor shaft support 34. A similar rotor shaft nut 48 is also provided for threadably securing the downstream end of the rotor shaft 22. Access opening 49 and closure bolt 50 in the nose 35 are similar in purpose and function to the opening 21 and closure bolt 20 previously described.

The clearances 51 and 52, provided between the respective opposing surfaces of the rotor mounting-shield assemblies 3 and 4 and the respective opposing surfaces of the rotor central hub 29 during normal flow metering operation of the rotor, are quite small because the maximum available fluid pressure is utilized, both upstream and downstream of the rotor assembly 5. In addition, because high balancing pressures are used, the rotor balancing system is extremely sensitive and reaches equilibrium conditions much more rapidly in response to flow stages. The flowmeter of this invention is, therefore, more accurate in metering low density liquids, such as gasoline.

The bullet-shaped, vaned rotor mounting-shield assemblies are of substantially identical contour and can be provided from a single mold. It is only necessary to modify the arrangement of the diagonal passages to establish the use as an upstream or a downstream rotor mounting-shield assembly. It is also contemplated that, by suitable valving in the diagonal passages 14 and 41, and by providing additional, oppositely angled valved passages, the flowmeter can be made reversible.

The flowmeter of the subject invention provides a relatively simple and accurate flowmetering device, particularly adaptable for low density fluids such as gasoline. The device is simple and economical to manufacture and is relatively easy to assemble.

Various modes of carrying out the invention are contemplated as being within the scope of the following claims particularly pointing out and distinctly claiming the subject matter which is regarded as the invention.

I claim:

1. A turbine flowmeter comprising in combination, a tubular housing having an inner surface and defining a passageway for fluid flow therethrough, a turbine rotor disposed coaxially in said tubular housing, said rotor including a central hub portion and a plurality of peripheral vanes radiating from said hub, said rotor being adapted to rotate in response to fluid flow through said tubular housing, a rotor shaft rotatably supporting said rotor, a first rotor mounting shield disposed coaxially in said tubular housing, and having a generally streamlined conical external profile for diverting fluid flow into said peripheral rotor vanes, said first mounting shield having a rotor shaft support means for supporting a first end of said rotor shaft, said first mounting shield having a central fluid pressure chamber having an enlarged opening at the widest end of said conical mounting shield and facing the hub of said rotor, a second rotor mounting shield also disposed coaxially in said tubular housing and including means supporting the other end of said rotor shaft, said second mounting shield being spaced from said first mounting shield a distance equal to the width of said rotor hub plus a small additional clearance to allow free rotation of said rotor on said rotor shaft between said first and second mounting shields, said second rotor mounting shield also having a generally streamlined conical external profile, and also having a central fluid pressure chamber having an enlarged opening at the widest end of said second conical mounting shield and facing the hub of said rotor, a plurality of mounting shield support members each having an upstream edge, said support members radiating from said first and second rotor mounting shields into supporting engagement with the inner surface of said tubular housing to coaxially position said mounting shields and said rotor in said tubular housing to define an annular fluid passage through the vanes of said rotor, and fluid conduit means extending diagonally inwardly from the mid-portions of the upstream edges of said mounting shield support members into the respective central fluid pressure chambers to provide high fluid pressure balancing forces against the opposite surfaces of said rotor to dynamically position said rotor between the first and second rotor mounting shields during fluid metering.

2. The apparatus of claim 1, in which said fluid conduit means in the downstream mounting shield support members are larger than said fluid conduit means in the upstream mounting shield support members to provide additional counterthrust to counterbalance the downstream drag caused by fluid impinging on the rotor vanes.

3. The apparatus of claim 1, in which a fluid diverting ring is disposed against the inner surface of said tubular housing to divert fluid flowing near said inner surface into said rotor vanes.

4. The apparatus of claim 1, in which the inner surface of said tubular housing includes spacing means engaging the mounting shield support members to establish the distance between the respective opposing surfaces of said first and second rotor mounting shields.

5. The apparatus of claim 1, in which the intake end of the respective fluid conduit means are disposed in the area of maximum fluid velocity head effect to obtain the maximum available fluid balancing force on the opposite surfaces of said rotor hub.

6. The apparatus of claim 1, in which said first and second conical rotor mounting shields each include a generally pointed outer end having a threaded opening extending axially therethrough to provide external access through the respective pressure chambers to the respective rotor shaft support means, and a threaded closure means for each of the threaded openings to provide a generally smooth external flow surface on each of said rotor mounting shields after assembly.

7. The apparatus of claim 1, in which said first and second rotor mounting shields are of identical contour to facilitate fabrication.

References Cited

UNITED STATES PATENTS

| | | | |
|---|---|---|---|
| 3,091,964 | 6/1963 | Francisco | 73—231 |
| 3,238,776 | 3/1966 | Potter | 73—231 |
| 3,248,943 | 5/1966 | Francisco | 73—231 |
| 3,398,930 | 8/1968 | Herman | 73—231 X |

RICHARD C. QUEISSER, Primary Examiner

E. J. KOCH, Assistant Examiner

U.S. Cl. X.R.

253—39